United States Patent
Kunze

[11] 4,014,562
[45] Mar. 29, 1977

[54] COUPLING HOOK FOR A THREE-POINT CONNECTION ON A TRACTOR

[75] Inventor: Dieter Kunze, Siegburg, Germany

[73] Assignee: Jean Waltersheid GmbH, Lohmar, Germany

[22] Filed: Jan. 30, 1976

[21] Appl. No.: 654,001

[30] Foreign Application Priority Data

Mar. 11, 1975 Germany .......................... 2510490

[52] U.S. Cl. .................................. 280/508; 280/509
[51] Int. Cl.² .......................................... B60D 1/10
[58] Field of Search ...... 280/508, 509, 510, 461 A

[56] References Cited

UNITED STATES PATENTS

| | | | |
|---|---|---|---|
| 2,429,761 | 10/1947 | Ketel | 280/508 |
| 2,783,059 | 2/1957 | Hartl | 280/509 |
| 2,951,711 | 9/1960 | Karnath | 280/508 |
| 3,539,203 | 11/1970 | Baugh | 280/509 |

FOREIGN PATENTS OR APPLICATIONS

| | | | |
|---|---|---|---|
| 1,205,395 | 11/1965 | Germany | 280/508 |

*Primary Examiner*—Robert R. Song
*Attorney, Agent, or Firm*—Edmund M. Jaskiewicz

[57] ABSTRACT

A coupling hook for lockingly engaging a coupling pin on an implement or the like has a pocket within which is pivoted an operating lever and a latch has one end pivotally connected to the operating lever and its other end projecting toward the jaw opening in which is received the coupling pin. The latch is pivotable and slidable upon a supporting pin such that when a coupling pin acts upon an unlocking surface on the latch during the coupling operation the latch will slide back into the pocket to permit the coupling pin to be received within the hook jaw. When the coupling pin is locked within the jaw the pin will bear against the locking surface of the latch to urge the supporting surface of the latch against an edge of an opening in the pocket through which the latch protrudes so that a moment is produced acting upon the latch and operating lever which urges the latch into the jaw opening.

4 Claims, 3 Drawing Figures

COUPLING HOOK FOR A THREE-POINT CONNECTION ON A TRACTOR

The present invention relates to a coupling hook for a three-point connection on a tractor for lockingly receiving a coupling pin on an implement or the like, more particularly, to structure for locking the coupling pin in the jaw of the coupling hook.

The coupling hooks which have been employed on three-point hitches of agricultural tractors have been provided with various forms of locking arrangements for securing a coupling pin associated with a trailer, agricultural implement or the like in the jaw of the hook. Such a locking arrangement generally comprised a spring-loaded latch and an operating linkage connected to the latch.

One form of such a snap closure is disclosed in the German Pat. No. 1,273,890 and comprises a blocking element held in its closed position by a compression spring and releasable through a linkage which is operated from the seat on the tractor. However, this closure had the disadvantage that the arcuately shaped blocking element was mounted in a guide passage having substantially the same shape and the blocking element was acted upon by a compression spring to be urged toward the jaw of the coupling hook. The blocking element could not be operated linearly by applying traction without tilting or jamming in its guide passage unless the blocking element was displaced by a complicated mechanism located in the line of the curved blocking element in order to open the lock of the coupling hook. Further, this closure was not provided with any safety structure for preventing accidental opening during any turning movements of the implement pin. Any self-locking feature which might be provided so as to act through the shape of the blocking element, for example, would strongly hinder intentional opening of the coupling hook. A further disclosed embodiment of a straight spring-loaded blocking element has the same disadvantage with respect to securing the locking arrangement against accidental opening.

A further snap closure is shown in British Pat. No. 1,226,501 and comprises a coupling hook whose frame is connected to ball joints provided on the lower guide rods of a tractor through a bore in the lower portion of the vertical supports. While this arrangement provides for required freedom for relative mobility of the coupled implement with respect to the tractor, the disadvantage exists that the pivot connection for the pins of the coupled implement is shifted away from the tractor and this results in a considerable loss of lifting force.

The locking arrangement of this coupling hook is incorporated in the coupling frame and thus access to the locking arrangement is difficult. Further, the locking arrangement is connected by a rod to a release lever which is locked during the release operation. In addition, the driver must step down and pivot the release lever toward the tractor. The locked lower crank lever is then pulled up from the dead position through the connecting rod on its center connection. The arm of the lower crank lever connected to the blocking lever pulls the locking element tangentially over and beyond the coupling pin into the opening position. At the same time, the upper crank lever is pivoted such that it is locked in the dead point position and retains the locking device open. The driver must again mount the seat, lower the lower guide rods until separated from the coupling pins, drive the tractor away from the uncoupled implement and again step down from the seat in order to move the locked upper crank lever from the dead position. The lower crank lever under the action of its torsion spring then again brings the locking arrangement into a position of operational readiness for the next coupling operation. This coupling hook is unsatisfactory in view of its discontinuous or interrupted sequence of operating steps. Further, this locking arrangement comprises a number of separate components and thus the cost of manufacture of this coupling hook was significantly increased.

It is therefore the principal object of the present invention to provide a novel and improved locking arrangement for a coupling hook employed on a three-point connection on agricultural tractors and the like.

It is another object of the present invention to provide such a coupling hook having a locking arrangement wherein the hook is fully operational when covered with dirt and other foreign matter and can be operated from the driver's seat of the tractor without the use of force.

It is a further object of the present invention to provide such a coupling hook having a locking arrangement wherein the unlocked coupling hook moves automatically into position ready for coupling and the hook is reliably retained in a locked position.

It is an additional object of the present invention to provide such a coupling hook having a locking arrangement which is structurally strong, is simple and reliable in operation and inexpensive to manufacture and maintain.

In the present invention there is provided a coupling hook having a latch pivotally connected to an operating lever which in turn is pivotally mounted in the hook pocket and the latch extends through an opening in the pocket toward the hook jaw. The hook pocket, the latch and a supporting pin are provided with co-acting supporting surfaces such that during the coupling operation the latch and operating lever are displaced into the opening or release position by the action of the implement coupling pin acting upon an unlocking surface on the latch. When the implement coupling pin is locked in the jaw of the coupling hook the pin acts upon a locking surface of the latch in such a manner so as to produce a moment acting on the latch and operating lever which will urge the latch into the coupling hook jaw.

According to one aspect of the present invention there is a supporting pin within the hook pocket and the latch has a first supporting surface which is pivotable and slidable on the supporting pin. The latch is also provided with a second supporting surface engagable with an edge of the pocket opening and the other end of the latch is provided with an unlocking surface and a locking surface. During the coupling operation the implement coupling pin will act upon the latch unlocking surface to displace the latch upon the supporting pin into the pocket. When the implement coupling pin is locked within the jaw opening the pin acts upon the latch locking surface to urge the latch second supporting surface against the edge of the pocket opening to produce a moment acting upon the latch and operating lever to urge the latch into the jaw opening.

The present invention has the advantage that a coupling pin when locked within the coupling hook will produce a moment of force directed against any opening movement because of the arrangement of the latch in the pocket and thus prevents accidental or undesirable opening of the coupling hook.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
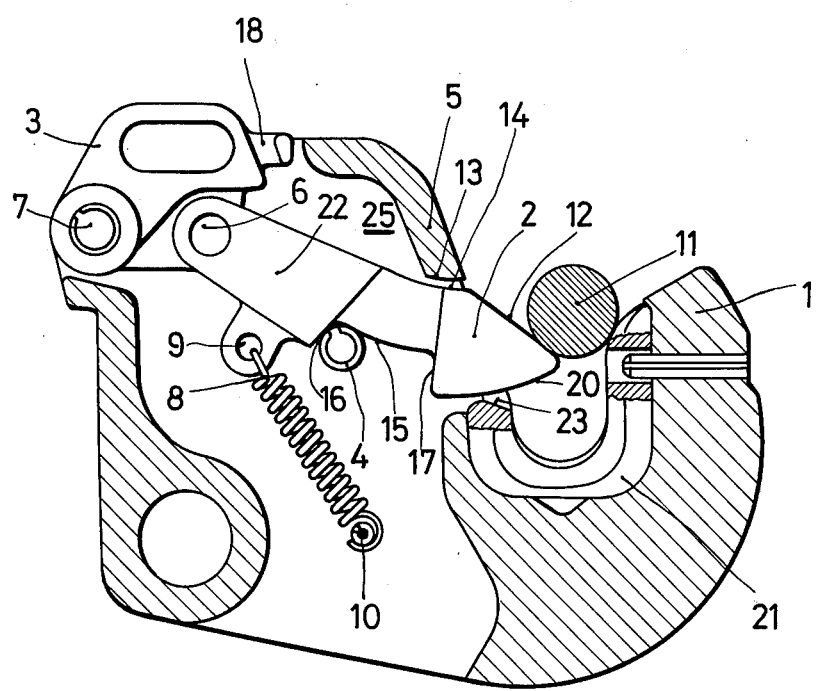
FIG. 1 is an elevational sectional view of a coupling hook according to the present invention in position for the coupling operation.

In FIG. 1 there is shown a coupling hook within which is formed a pocket 25 and having a jaw 1. In the jaw opening there is pivotably mounted an insert 21 having a hook jaw 27 in which is received an implement coupling pin 11.

The closure mechanism for the coupling hook comprises a latch 2 whose inner end is pivotally connected at 6 within the pocket 25 to an operating lever 3 which in turn in pivotally mounted at 7. The operating lever is provided with an eye 18 to which can be attached a suitable chain or cable so as to exert traction force against the operating lever. The latch 2 is provided with a notch having a guide surface 15 which is slidable and pivotable upon a supporting pin 4 within the pocket 25. The notch is also provided with end surfaces 16 and 17.

The free end of the latch 2 is provided with a locking projection 19 which extends into the jaw opening 27 through an opening 26 of the pocket 25. The upper surface of the locking projection 19 is provided with a curved releasing or unlocking surface 12 and the lower portion is provided with a curved locking surface 20. On the upper surface of the latch 2 immediately behind the release surface 12 there is a curved locking surface 14 which is positioned opposite a curved supporting surface 13 formed on the edge of the pocket opening 26 and on an abutment or wall 5 of the hook.

The central portion of the latch 22 located between the bearing pin 6 and latch projection 19 has a smaller cross-section and has formed thereon an upper spring bearing 9 in which is received one end of a tension spring 8 with the other end of this spring being mounted on a pin 10 located within the pocket 25.

The latch 2 is mounted within the pocket 25 in such a manner that after the latch contacts the outer surface of supporting pin 4 the latch is tilted by the spring 8 about the pin 4 to cause the latch to slide in the notch 15, 16, 17 so that the curved lock surface 14 on the latch contacts the support surface 13. As a result of this construction, the spring 8 constantly moves the latch 2 into a position in readiness for coupling. In this position, the latch 2 in the pocket opening 26 is pressed upwardly against the abutment support surface 13 while being tilted about the supporting pin 4 and sliding in the notch 15, 16, 17 of the latch.

In addition, in the position ready for coupling, a gap or space is formed between the latch locking surface 20 and the abutment 23 on the lower edge of the pocket opening 26. The presence of this gap is advantageous in that latches which may become stuck and rusty after prolonged non-use of the coupling device can be immediately released under the pressure of an implement pin 11 which is dropped in the jaw opening for the purpose of coupling. The presence of this gap thus assures the reliability of the coupling operation.

A further advantage is that the spring 8 simultaneously moves the operating lever 3 into an opening of the pocket 25 which thus closes the pocket 25 in its upper portion and prevents entry of dirt and other foreign matter.

The unlocking surface 20 of the latch and the latch lock surface 14 have such a curvature that a radius projected through the point of contact of the unlocking surface 20 and the surface of the pin 11 and a radius projected through the contact between the lock surface 14 and supporting surface 13 will pass through the same center and that these radii will form an angle which is smaller than 7°. This relationship automatically inhibits undesirable or accidental opening of the coupling hook. The locking structure of the coupling hook will thus not automatically open under working conditions. The lock surface 14 and the unlocking surface 20 have such curve configurations that the friction produced between the two surfaces remains at the optimum effectiveness throughout the duration of contact of the surfaces.

OPERATION

In order to couple an implement, trailer or other apparatus having a three-point connection to a tractor provided with the coupling hook of the present invention, the tractor is set in reverse so as to back up toward the implement and the guide rods are shifted under the coupling pins on the implement. When a guide rod is lifted, implement pin 11 will be pressed into the jaw opening 27 of the hook 1 and will engage unlocking surface 12 on the latch to tilt the latch 2 about the supporting pin 4. As the latch 2 is tilted about the supporting pin 4 it will also slide on its curved guide surface 15 in the direction of the operating lever 3 as a resultant of the force acting on the latch locking surface 12.

This upward movement of the latch 2 will cause the bearing pin 6 to be pivoted upwardly by operating lever 3 along a circular path around the pivot connection 7. Because of the curvature of the guide surface 15 and the circular movement of the pivot pin 6 around the pivot mound 7, the latch projection 19 of latch 2 will describe a curve which unblocks the jaw opening 27 which then receives the coupling pin 11 which is sliding downwardly on the locking surface 12.

The rear edge 17 of the notch 15, 16, 17 abuts supporting pin 4 so that both the rear wall of the hook and also the catch hook insert 21 are not subjected to a load.

After the coupling pin 11 is received within the jaw opening, the latch 2 will turn about its pivot pin 6 and its lock surface 14 will slide upon supporting surface 13 so that the latch returns to its initial or starting position and locks the coupling hook. The spring 8 will produce a moment about the pivot pin 6 so that on locking of the latch 2 there will be an abutting engagement between the supporting and lock surfaces 13, 14. This will reduce friction forces during the locking phase and will also increase the restoring forces for the locking sequence.

Figure 2:
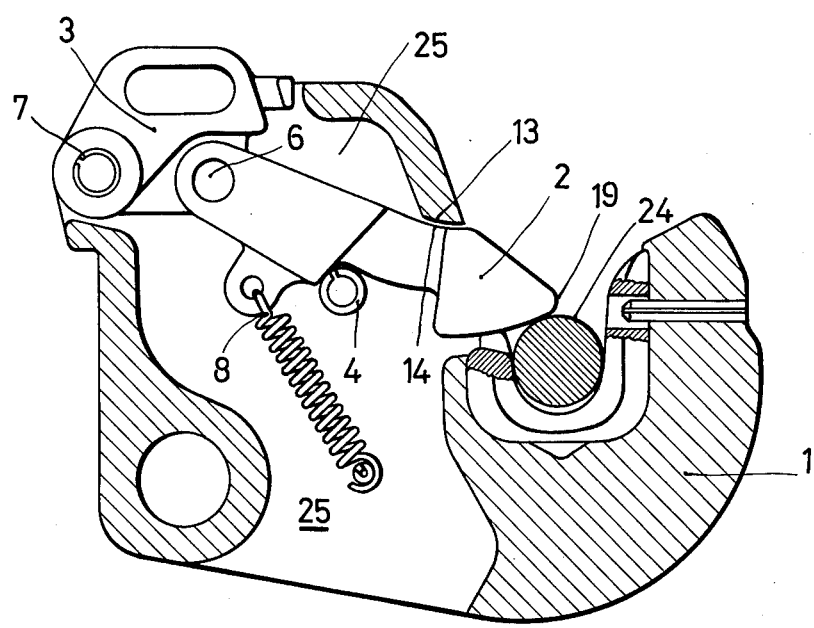
FIG. 2 is a view similar to that of FIG. 1 but showing the implement coupling pin locked within the coupling hook; and, FIG. 3 is a view similar to that of FIG. 1 also showing the coupling hook in position for coupling but showing a supporting pin arranged in a lower position within the pocket.
Figure 3:
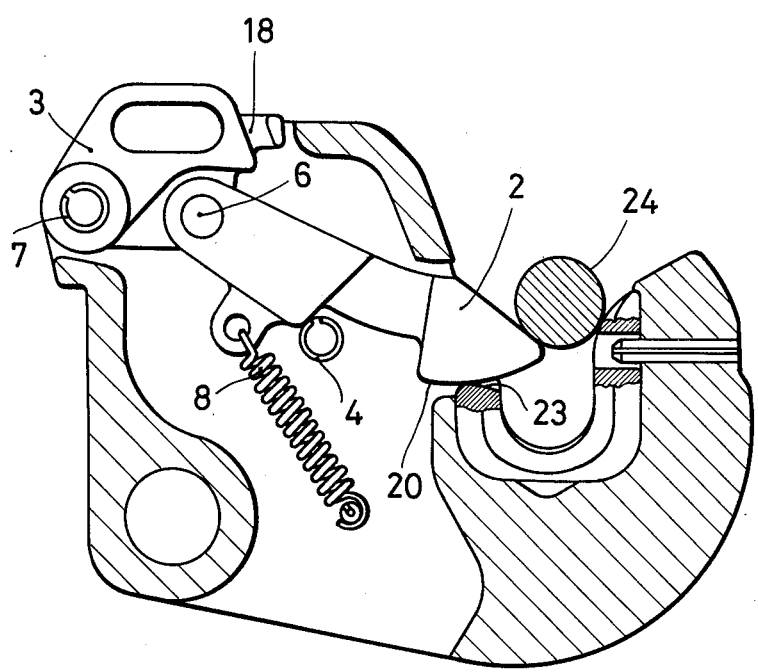

In the locked position, as shown in FIG. 2, implement pin 11 will exert forces and moments on latch locking surface 20 which urge the lock surface 14 of latch 2 against support surface 13 on the edge of the pocket opening 26. The latch will also act on supporting pin 4 at the point of contact with guide surface 15 and end surface 16. The forces acting at these points will produce a self-locking of the latch.

This locking effect can be increased by increasing the angle formed by a line projected through the pivot axes of the pins 6 and 7 and a line passing through pivot point 6 and the contact point between the support surface 13 and lock surface 14. This increase can be brought about by the force exerted by the pin 11, the contact of the lock surface 14 on the abutment surface 13 and the bearing pin 6 as a pivot. The increased angle will thus approximate 180°. The increase in this angle will produce a moment which urges the latch into the jaw opening into its locked position and will thus prevent any automatic opening of the coupling hook.

To unlock the coupling hook, the tractor operator pulls on the line connected to the eye 18 of the operating lever 3 to pull the lever 3 upwardly as viewed in the drawings so that the latch pivot connection 6 will be moved upwardly about the pivot mount 7. The force exerted on the operating lever is perpendicular to or at an angle up to about 60° on either side of a line passing through pivot mount 7 and the traction eye 18.

The latch 2 because of its connection to the operating lever 3 will be moved in a direction away from the jaw opening 27 and the surfaces 13 and 14 will be in frictional engagement because of the force produced on the bearing connection 6 by the tension spring 8. As the latch 2 is guided upwardly by means of the operating lever 3 and the curved surfaces 13, 14 the latch projection 19 will unblock and release the jaw opening 27 to permit unlocking and release of the implement pin 11. It is to be noted that the supporting pin 4 is not contacted by the latch 2 during this sequence which reduces friction during the unlocking phase.

A further advantage of utilizing the supporting surface 13 as a stop for locking surface 14 during the unlocking operation is that when the operating lever 3 pivots about its connection 7, the latch 2 bearing against support surface 13 as an abutment forms a long lever through its pivot connection at 6 which facilitates the release of the implement pin 11. At the same time, during the opening operation, the latch moves radially and tangentially with respect to the implement pin 11 which, in comparison with the near tangential unlocking movement of known prior art arrangements, significantly facilitates release of the latch even from jammed implement pins.

It is to be further noted that the locking arrangement as described above remains operational both for locking and unlocking of the implement pin in the event the spring 8 should break.

If desired, forces required for unlocking may be reduced by extending the lever arm 7, 18.

Thus it can be seen that the present invention has disclosed a locking arrangement for a coupling hook which is simple in construction, reliable in operation and required a minimum of moving components.

It will be understood that this invention is susceptible to modification in order to adapt it to different usages and conditions, and accordingly, it is desired to comprehend such modifications within this invention as may fall within the scope of appended claims.

What is claimed is:

1. A coupling hook for a three-point connection on a tractor comprising a hook body portion and a jaw extending therefrom to define a jaw opening for receiving a coupling pin on an implement and the like, said hook body portion having a pocket therein and an opening in said pocket, an operating lever pivotally mounted in said pocket, a latch within said pocket having one end pivotally connected to said operating lever and its other end extending through said pocket opening toward said jaw, said latch having open and locked positions with respect to a coupling pin in said jaw opening, a supporting pin within said pocket and said latch having a first supporting surface pivotable and slidable on said pin, said latch having a second supporting surface engagable with an edge of said pocket opening and the other end of said latch having an unlocking surface and a locking surface such that a coupling pin acting upon said latch unlocking surface during the coupling operation will slide said latch upon said supporting pin into said pocket and when a coupling pin is locked within said jaw opening said coupling pin acts upon said latch locking surface to urge said latch second supporting surface against said pocket opening edge to produce a moment acting upon said latch and operating lever urging said latch into said jaw opening.

2. A coupling hook as claimed in claim 1 and a spring connected to said latch and urging said latch to pivot about and slide upon said supporting pin to urge said latch second supporting surface against said pocket opening edge and to urge the pivotal connection between said latch and operating lever into said pocket.

3. A coupling hook as claimed in claim 1 wherein said latch second supporting surface and said locking surface each have a curvature such that a radius through the point of contact of said locking surface and coupling pin and a radius through the point of contact of said second supporting surface and said pocket opening edge have the same center and the radii define an angle of less than 7°.

4. A coupling hook as claimed in claim 1 and means on said hook for defining a stop for said latch locking surface during the unlocking operation.

* * * * *